US010003956B2

(12) United States Patent
Veneroso

(10) Patent No.: US 10,003,956 B2
(45) Date of Patent: *Jun. 19, 2018

(54) METHOD FOR PERFORMING A REMOTE MANAGEMENT OF A MULTI-SUBSCRIPTION SIM MODULE

(71) Applicant: STMicroelectronics S.r.l., Agrate Brianza (IT)

(72) Inventor: Amedeo Veneroso, Caserta (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/724,500

(22) Filed: Oct. 4, 2017

(65) Prior Publication Data

US 2018/0027407 A1    Jan. 25, 2018

Related U.S. Application Data

(63) Continuation of application No. 15/475,810, filed on Mar. 31, 2017, now Pat. No. 9,820,139.

(30) Foreign Application Priority Data

Jul. 4, 2016  (IT) .................. 102016000069354

(51) Int. Cl.
*H04W 8/18* (2009.01)
*H04B 1/3816* (2015.01)
*H04W 8/20* (2009.01)

(52) U.S. Cl.
CPC .......... *H04W 8/183* (2013.01); *H04B 1/3816* (2013.01); *H04W 8/205* (2013.01)

(58) Field of Classification Search
CPC ..... H04W 8/183; H04W 8/205; H04B 1/3816
See application file for complete search history.

(56) References Cited

U.S. PATENT DOCUMENTS 8,868,041 B2 * 10/2014 O'Leary ................. H04W 8/22
455/405
2007/0259691 A1 * 11/2007 Santos Garcia ...... H04W 8/183
455/558

(Continued)

FOREIGN PATENT DOCUMENTS

CN      205283827 U    6/2016
WO      2016023675 A1  2/2016

OTHER PUBLICATIONS

"Smart Card; Secured packet structure for UICC based applications (Release 9)," ETSI TS 102 225, V9.0.0, Apr. 2010, 22 pages.

(Continued)

*Primary Examiner* — Brandon J Miller
(74) *Attorney, Agent, or Firm* — Slater Matsil, LLP

(57) ABSTRACT

A method is provided for performing a management of a multi-subscription SIM module. The multi-subscription SIM module includes at least one memory adapted to store at least a first and a second profile associated with a respective first and a second mobile network operator. The memory includes a volatile portion. The operation of storing includes installing or updating profiles by downloading one or more downloaded profiles from a remote host. The management includes selecting one or more enabled profiles including an application to be executed and allocating a partition of the volatile portion of the memory to the one or more enabled profile.

20 Claims, 12 Drawing Sheets

(56) References Cited

U.S. PATENT DOCUMENTS

| | | | |
|---|---|---|---|
| 2008/0086614 A1* | 4/2008 | Canis | G06F 21/121 |
| | | | 711/163 |
| 2015/0271662 A1 | 9/2015 | Lhamon et al. | |
| 2015/0281964 A1* | 10/2015 | Seo | H04L 63/102 |
| | | | 726/9 |
| 2016/0021529 A1 | 1/2016 | Park et al. | |
| 2016/0183095 A1* | 6/2016 | Huber | H04L 63/102 |
| | | | 455/411 |
| 2016/0241537 A1* | 8/2016 | Cha | H04W 12/04 |
| 2016/0271662 A1* | 9/2016 | Kurz | B21B 27/032 |
| 2017/0041864 A1* | 2/2017 | Kaliner | H04W 8/205 |

OTHER PUBLICATIONS

"Smart Card; Secured packet structure for UICC based applications (Release 9)," ETSI TS 102 225, V9.2.0, Mar. 2012, 22 pages.
"GlobalPlatform—Advancing Standards for Smart Card Growth," GlobalPlatform, Card Specification, Version 2.1.1, Mar. 2003, 237 pages.
"Remote Provisioning Architecture for Embedded UICC Technical Specification," GSM Association, Version 1.0, Dec. 17, 2013, 294 pages.

* cited by examiner

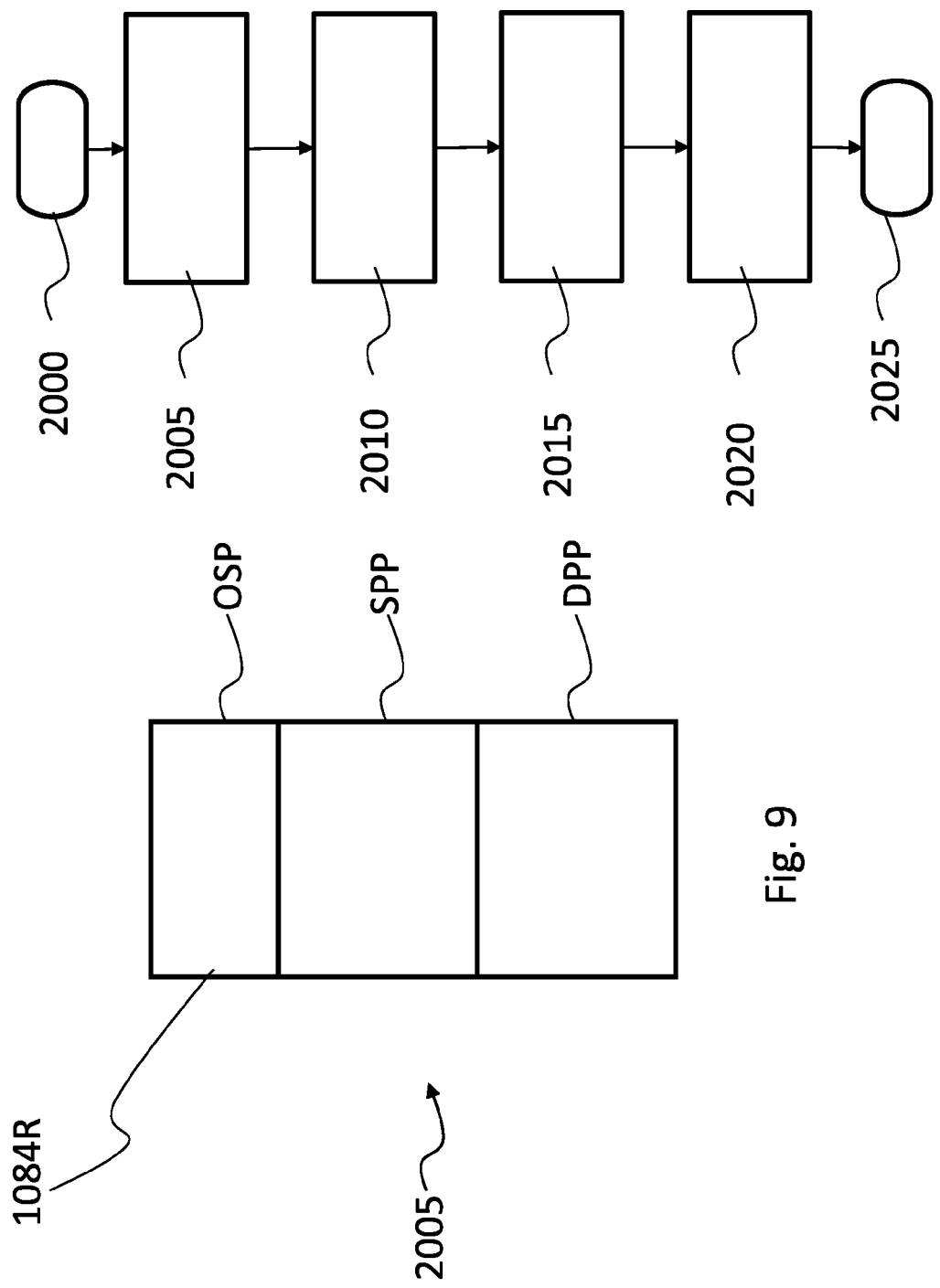

METHOD FOR PERFORMING A REMOTE MANAGEMENT OF A MULTI-SUBSCRIPTION SIM MODULE

CROSS-REFERENCE TO RELATED APPLICATIONS

This application is a continuation of U.S. patent application Ser. No. 15/475,810 entitled "Method for Performing a Remote Management of a Multi-Subscription SIM Module," filed Mar. 31, 2017, which application claims priority to Italian Patent Application No. 102016000069354, filed on Jul. 4, 2016, which applications are hereby incorporated herein by reference.

TECHNICAL FIELD

Embodiments of the present disclosure relate to a method for performing a remote management of a multi-subscription sim module, and a corresponding sim module and computer program product.

BACKGROUND

Embodiments of the present disclosure relate in particular to the technical context of Remote SIM Provisioning technology, also known as the Embedded UICC (Universal Integrated Circuit Card).

Due to new requirements of miniaturization and robustness, the industry has developed an evolution of the traditional SIM (Subscriber Identity Module) cards called "embedded UICC" (Universal Integrated Circuit Card). This evolution envisages that the SIM card is soldered (or in any case made hardly accessible) in the hosting device that can be a mobile phone, a modem, a board inserted in a device, etc.

Soldering presents distinct advantages such as the possibility of reducing the size of the SIM device and hence of the modem, the improvement of the robustness of the contacts (soldered contacts are typically more reliable than interfaces between replaceable components), the increased antitheft protection.

On the other hand, soldering a SIM (or making it hardly accessible) introduces new requirements and issues that need to be addressed, such as, because the SIM is not replaceable, means should be available to allow the operator change. In addition, specific operations (such as device repairing), that today are typically performed after the SIM removal, require a way to disable the SIM card.

To address the above requirements, the industry has defined a new technological standard called "embedded UICC" or "Remote SIM provisioning".

The basic concepts of the new technological standard are the following: one entity is defined to allow the download/enable/delete of profiles (for instance the Issuer Secure Domain Root ISD-R, see for instance "*Remote Provisioning Architecture for Embedded UICC, Technical Specification*, Version 1.0, 17 Dec. 2013") the UICC may contain several mobile network operator subscriptions; each operator subscription is represented by a "profile"; and every profile may be seen as a container; the container is managed by a security domain (for instance the Issuer Secure Domain Profile ISD-P).

In this context, FIG. 1 shows a possible architecture of a "user equipment" 10, such as a mobile device, e.g., a smartphone or a tablet, or a mobile communication module usually to be used in embedded systems.

Generally, the device 10 comprises one or more processors 102 connected to one or more memories 104. The device 10 comprises moreover at least one mobile communication interface 106 for communication with a base station BS.

For example, the mobile communication interface 106 may comprise a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver.

A mobile device comprises often also a user interface 110, such as a touchscreen. Conversely, a communication module to be used, e.g., in embedded systems, such as alarm systems, gas meters or other types of remote monitoring and/or control systems, often does not comprise a user interface 110, but a communication interface 112 in order to exchange data with a further processing unit of an embedded system. For example, in this case, the interface 112 may be a digital communication interface, such as a UART (Universal Asynchronous Receiver-Transmitter), SPI (Serial Peripheral Interface) and/or USB (Universal Serial Bus) communication interface. Generally, the processing unit 102 may also be directly the main processor of an embedded system. In this case the interface 112 may be used to exchange data with one or more sensors and/or actuators. For example, in this case, the interface 112 may be implemented by means of one or more analog interfaces and/or digital input/output ports of the processing unit 102.

In the memory 104 may be stored, e.g., an operating system OS being executed by the processor 102 and which manages the general functions of the device 10, such as the management of the user interface no and/or the communication interface 112 and the establishment of a connection to the base station BS via the interface 106. The memory 104 may also contain applications being executed by the operating system OS. For example, in the case of a mobile device, the memory 104 often comprises a web browser application WB.

For establishing a connection with the base station BS, the device 10 is coupled to a processing unit 108 configured to manage the identity identification of the user. For example, usually a mobile device comprises a card holder for receiving a card comprising a Subscriber Identity Module (SIM), which is usually called SIM card. Generally a corresponding SIM module may also be installed directly within the device 10. In the example of FIG. 1 it is used a Universal Integrated Circuit Card (UICC) 108, which is a smart card often used in GSM and UMTS networks. The UICC ensures the integrity and security of all kinds of personal data and typically holds a few hundred kilobytes. Also a UICC may be integrated directly in the device 10 and is in this case often called embedded UICC (eUICC).

For example, in a GSM network, the UICC 108 contains a SIM application and in a UMTS network a USIM application. A UICC may contain several applications, making it possible for the same smart card to give access to both GSM and UMTS networks, and may also provide storage of a phone book and other applications.

Accordingly, the reference to a SIM module in the following of the present description is intended to include both 2G and/or 3G SIM modules and applies also the case in which such a SIM module is provided on a SIM card.

As shown in FIG. 2, a SIM module 108 often comprises one and more processors 1082 and one or more memories 1084 for executing applications stored in the memory 1084 of the module 108. For example, the SIM module 108 may comprise in addition to the Subscriber Identity Module application (reference sign SIM in FIG. 2) at least one further application APP. For example, this application APP may be configured to communicate (directly, or indirectly via the processor 102 and possibly the operating system OS) with the mobile communication interface 106 in order to send data to and/or receive data from a remote host 30. For this purpose, the host 30 may be connected via a network 20, such as a Local Area Network (LAN) or a Wide Area Network (WAN), such as the internet, to the base station BS. Accordingly, connection between the host 30 and the UICC 108 may be established by means of the network 20, the base station BS and the communication interface 106.

Generally, the communication may be initiated by the host 30 or the UICC 108. For example, the application APP may be a web server application, which receives requests from the web browser WB of a mobile device 10 and obtains respective content from a remote host 30, such as a web server. The application APP may also be an authentication application. In this case, the host 30 may send an authentication request to the UICC 108 and the UICC 108 may send an authentication response to the host 30.

FIG. 3 shows in this respect a typical architecture of the software layers of a UICC card. Substantially, a UICC 108 comprises a hardware layer UICC_HW being represented (at least) by the processor 1082 and the memory 1084. On top of the hardware layer UICC_HW runs an operating system UICC_OS of the UICC card. Generally, the operating system UICC_OS may manage a plurality of applications. For example, in the example considered, a Java Card System JCS is executed by the operating system UICC_OS, which manages and runs applets, i.e., applications using the APIs (Application Programming Interface) provided by the Java Card System JCS.

For example, the Java Card System JCS comprises usually a SIM and/or USIM API (identified with the reference sign (U)SIM API) which manages the basic Subscriber Identity Module commands and provides functions to higher level SIM or USIM applets (identified with the reference sign (U)SIM_APP).

Generally, the communication with the remote host 30 may be performed via short messages of the Short Message Service (SMS) and/or by means of a Bearer Independent Protocol (BIP), such as GPRS, EDGE, or UMTS. The Java Card™ Platform provides a JAVA™ runtime environment, which is particularly optimized for smart cards. This technology is well known to those skilled in the art, rendering a more detailed description herein superfluous.

Often the Java Card System JCS comprises a GlobalPlatform module GP according to the "*GlobalPlatform Card specification*," e.g., version 2.2.1. Also this standard is well known to those skilled in the art, rendering a more detailed description herein superfluous. Basically, the GP module provides features such as user authentication through secure channels, or the installation and remote management of the applets. For example, one of the possible encryption mechanisms managed by the GP module may be the SCP (Secure Channel Protocol) 80 specified in the technical specification ETSI TS 102 225 "*Smart Cards; Secured packet structure for UICC based applications*," e.g., version 9.0.0.

The above mentioned API functions may then be used by applets, such as the SIM or USIM applet (U)SIM_APP, a basic applet B_APP and/or a secure applet S_APP.

The UICC 108 may comprise also further applications, such as a Smart Card Web Server SCWS and possible Web server applets SCWS_APP, which e.g., perform the above-mentioned web server function.

Generally, the UICC 108 may comprise not only custom applets but also native low level applications N_APP being executed directly by the operating system UICC_OS.

For example, FIG. 4 shows a typical communication by using the remote management protocol, such as the SCP 80 protocol as specified in the technical specifications ETSI TS 102 225 "*Smart Cards; Secured packet structure for UICC based applications*", e.g., version 9.0.0, and in particular in ETSI TS 102 226 "*Smart Cards; Remote APDU structure for UICC based applications*", e.g., version 9.2.0.

In the example considered, the remote host 30 may send a command, i.e., a Command Application Protocol Data Unit C-APDU, to an application installed on the UICC 108 and receive from the application a respective response, i.e., a Response Application Protocol Data Unit R-APDU.

For example, the host 30 may send the command C-APDU to a Short Message Service-Service Centre SMSC, which sends a short message to the device 10. The Short Message Service-Service Centre SMS-SC, may also encrypt the command C-APDU, e.g., by using the SCP80 protocol, and encapsulates the encrypted content in a SMS message, which is then transmitted by means of the base station BS to the device 10. The device 10 may recognize that the short message contains a remote management message, e.g., a SCP80 packet, and send the latter to the UICC 108 by means of a so called ENVELOPE. The UICC 108, possibly by using the functions provided by the operating system UICC_OS and the Java Card System JCS, determines the content of the SMS message, e.g., if required the UICC may decrypt the message, and forwards the content C-APDU to the target application.

In order to forward the C-APDU, the UICC 108 should be able to identify the corresponding target application. For this purpose, usually a TAR (Toolkit Application Reference) code, consisting, e.g., of 3 bytes, is associated with each applications installed in the UICC. For example, in FIG. 4 a code TAR1 is associated with the SIM application SIM_APP, a code TAR2 is associated with the application B_APP and a code TAR3 is associated with the secure application S_APP.

Accordingly, it is sufficient to include the TAR code of the target application in the short message sent to the UICC 108, e.g., in the short message header or the SCP80 packet, and the UICC has only to compare the TAR code received with the various TAR codes of the applications installed in the UICC.

Generally, instead of using short messages, any other communication could be used for exchanging remote management messages with a SIM module 108, such as a communication based on the IP protocol, e.g., the TCP (Transmission Control Protocol) or UDP (User Datagram Protocol) protocol.

For example, the above remote management communications may be used in order to update the Preferred Roaming List (PRL), i.e., the list and priority of roaming partners, which may be stored directly within the memory of the UICC 108.

In this case, the UICC may comprise an application which manages the Preferred Roaming List and the remote host may send one or more C-APDU with the updated roaming information and the TAR code of the application to the UICC 108.

The present disclosure deals in particular with solutions for performing a management of a SIM module having installed applications provided by different mobile phone operators, i.e., a so called multi-subscription SIM, which is preferably an embedded multi-subscription SIM module, preferably a multi-subscription eUICC. For example, such multi-subscription SIM modules may be used as embedded SIM modules, e.g., eUICC, or as SIM cards to be installed in automated machines, which often are not easily reachable, such as remote monitoring and/or control systems, such as a gas meters.

FIG. 5 shows an embodiment of a multi-subscription SIM module 108a.

In the embodiment considered, the SIM module 108a supports at least two profiles P1 and P2 of two mobile network operators. In general the SIM module 108a can support also more than two profiles, i.e., a plurality of profiles.

For example, in the embodiments considered, the software architecture is based on the Java Card System described with respect to FIG. 3. For example, also in this case, a Java Card System JCSa is executed by an operating system UICC_OS, which manages and runs applets, i.e., applications using the APIs (Application Programming Interface) provided by the Java Card System JCSa. For example, the Java Card System JCS may comprise a SIM and/or USIM API (identified with the reference sign (U)SIM API) which manages the basic Subscriber Identity Module commands and provides functions to higher level SIM and/or USIM applets. Moreover, the Java Card™ Platform may provide a JAVA™ runtime environment. In an embodiment, the Java Card System JCSa may also comprise a GlobalPlatform module GP according to the "*GlobalPlatform Card specification*", e.g., version 2.2.1. The above mentioned API functions may then be used by the applets, such as the SIM and/or USIM applet (U)SIM_APP, a basic applet B_APP and/or a secure applet S_APP.

Each profile P1/P2 is represented by a memory area in the memory 1084 of the SIM card for storing applets APP, such as a respective (U)SIM_APP applet for each profile P1/P2. In the memory area may also be stored the respective authentication data AUTH of the SIM card used to access the mobile network of the mobile network operator. In various embodiments, each profile P1/P2 may also have associated a respective Over The Air (OTA) Key, which are usually used to encrypt (e.g., according to the SCP80 protocol) the remote management commands sent by a mobile network operator to a given SIM card. Usually, while the authentication data AUTH are SIM specific, often a single OTA key is used by a given mobile network operator.

In various embodiments, each profile P1/P2 may have associated a respective file system area FS, e.g., in order to store new applets APP and/or for storing user data, such as the user's contact list, or the above mentioned preferred roaming partner list.

Generally, while the profile data have been shown in the applet/application layer, each profile may also comprise applications and/or API in the Java Card System JCSa. Moreover, the profile data may also include configuration data which influence directly the API layer.

In the embodiment considered, the UICC 108a comprises moreover a profile manager application PM. For example, in the embodiments considered, this profile manager PM is provided in the API layer. However, the profile manager PM may also be at the applet layer, or be distributed between the API and the applet layers.

FIG. 6 shows in this respect a possible embodiment of a device boa, such as a mobile device or a mobile communication module, having (pre)installed the above described multi-subscription SIM module 108a, e.g., in the form of an embedded SIM module, e.g., a eUICC.

In the embodiment considered, similar to what has already been described with respect to FIG. 1, the device boa may comprise one or more processors 102a connected to one or more memories 104a. The device boa comprises moreover at least one mobile communication interface 106a for communication with a base station BS. For example, the mobile communication interface 106a may comprise a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver. The device boa may comprise also a user interface 110a, such as a touchscreen.

In the embodiment considered, in the memory 104a is stored an operating system OSa being executed by the processor bola and which manages the general functions of the device boa, such as the management of the user interface 110a the establishment of a connection to a base station BS via the interface 106a.

In the embodiment considered, the memory 104a contains also an application CFG configured for communicating with the profile manager PM of the SIM module 108a in order to manage the profiles installed in the SIM module 108a. For example, in some embodiments, the application CFG is configured for communicating with the profile manager PM in order to select or enable one of the profiles P1/P2 installed in the SIM card 108a.

For example, in an embodiment, the SIM module 108a may have preinstalled the profiles of a plurality of mobile network operators and when the device boa is started for the first time (or generally during a configuration phase), the user may activate by means of the application CFG one of the profiles P1/P2.

In some embodiments, the application CFG may be configured to install and/or update a profile in the SIM module 108a. For example, the application CFG may access a remote host in order to download a list of mobile network operators. Next the application CFG may be used to subscribe to one of the mobile network operators and obtain the respective profile data, which may then be loaded on the SIM module 108 by means of the application CFG and the profile manager PM.

Thus, several profiles can be present concurrently on the same card representing several operators. Only one profile can be enabled at any given time, all the others being disabled.

The profiles may be downloaded through remote protocol (OTA) after card issuance; profiles may also be deleted.

In the above scenario, it is apparent that each profile to be stored demands memory resources to arrange the data and applications.

The memory 1084 or 1084a includes two kinds of memory resources on smartcards. One kind is non-volatile memory (NVM), representing memory that is not reset upon card cycle (power off/power on). This memory is typically realized by using Flash memory or EEPROM memory. The second kind is volatile memory, representing memory whose value is reset at card cycle. The memory is typically realized by using RAM memory.

On current smart card products the NVM amount is by far higher than the RAM amount: as an example, a high end smart card product supports for instance 1.2 MB of Flash memory and 30 kb of RAM.

Data structures (such as files) are stored in NVM; application code and persistent data are stored in NVM as well, but application volatile variables are typically stored in RAM memory, because the memory access is much faster.

This results in the fact that the RAM memory is typically the bottleneck of the memory for downloading applications. In case of Embedded UICC, as there are several profiles each of that containing several applications, the problem is amplified: every profile has its need of volatile memory that needs to be arranged.

The problem may be addressed in many ways. A solution is to perform reservation at profile loading time. In this solution, the RAM memory is fully allocated to each and every profile at profile loading time, in particular when the profile is downloaded from remote. The total RAM memory required is the sum of all the RAM memory allocated to every profile.

By way of example, if profile P1 contains 3 applications, consuming a total of 10 kb, profile P2 contains 2 applications, consuming a total of 7 kb, profile P3 contains 2 applications, consuming a total of 9 kb, the memory is allocated to each profile P1, P2, P3 when downloaded, for a total of 26 kb required.

Such solution is very reliable (all the profile resources are guaranteed), but it is also very inefficient from the point of view of the memory usage: the memory required to arrange all the profiles is the sum of all the memory of the profiles, but such an amount of memory is not always required; in fact, only one profile is active at a time, therefore the memory allocated to the other profiles is not used. If the active profile is changed, then it is operated a power cycle reset to change the profile and this resets all the data, so the former profile memory can be deallocated.

Another solution provides reservation at memory request. In this solution, the RAM memory is allocated to every entity each time the entity requires the memory usage (dynamic approach).

By way of example, if profile P1 contains 3 applications, profile P2 contains 2 applications, profile P3 contains 2 applications, and no memory is allocated at profile download, the RAM is allocated only for the applications running.

The above solution implies that the profile RAM resources grow over time and at any time they can overflow the available memory resources.

This is dangerous on smartcards, as an application requesting memory for performing an operation and not obtaining it is subject to a fault. Faults are often used by hackers to identify security weaknesses.

SUMMARY

Embodiments of the present disclosure relate to solutions for performing for performing a management of a multi-subscription SIM module. The multi-subscription SIM module comprises at least one memory adapted to store at least a first and a second profile associated with a respective first and a second mobile network operator. The memory comprises a volatile portion. The operation of storing includes installing or updating profiles by downloading one or more downloaded profiles from a remote host. The management includes selecting one or more enabled profiles (Ps) comprising an application to be executed and allocating a partition of the volatile portion of the memory to the one or more enabled profile.

One or more embodiments concern a related SIM module as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

As mentioned in the foregoing, the present disclosure provides solutions regarding a method for performing a remote management of a multi-subscription SIM module. The area of the volatile memory is divided in a partition for the operative system, a partition for each of the one or more enabled profiles and a partition for a downloaded profile. The partition for the enabled profile and the partition for a downloaded profile have the same size. The partition for the enabled profile (SPP) is allocated to the enabled profile, maintaining the partition for a downloaded profile not accessible. During a profile download operation, only the partition for a downloaded profile is accessed allocating the partition for a downloaded profile to the downloaded profile. During a profile change operation, the downloading profile from the partition is swapped for a downloaded profile to one of the partitions for the enabled profile.

In variant embodiments, the solution here described may include that the profile change operation is performed after a card reset, in particular a power cycle.

In variant embodiments, the solution here described may include that the allocating the partition for the enabled profile to the enabled profile is performed at power-on.

In variant embodiments, the solution here described may include that the multi-subscription SIM module is an eUICC card.

In variant embodiments, the solution here described may include that the volatile memory is a RAM memory.

In variant embodiments, the solution here described may include that the management of a multi-subscription SIM module includes selecting one enabled profile comprising an application to be executed and allocating a partition of the volatile portion of the memory to the enabled profile. The method can further include dividing the area of the volatile memory in a partition for the operative system, a partition for the enabled profile and a partition for a downloaded profile. The partition for the enabled profile and partition for a downloaded profile have the same size. The method also includes allocating the partition for the enabled profile to the enabled profile, maintaining the partition for a downloaded profile not accessible. During a profile download operation, only the partition for a downloaded profile allocating the partition is accessed for a downloaded profile to the downloaded profile. During a profile change operation, the downloading profile from the partition is swapped for a downloaded profile to the partition for the enabled profile.

The present disclosure provides also solutions regarding a multi-subscription SIM module comprising at least one processor and at least one memory adapted to store at least a first and a second profile associated with a respective first and a second mobile network operator, such that a respective content may be associated with each profile, the memory comprising a volatile portion, wherein the multi-subscription SIM module is configured for implementing the method of any of the previous embodiments.

The present disclosure provides also solutions regarding a computer-program product that can be loaded into the memory of at least one processor and comprises portions of software code for implementing the method of any of the previous embodiments.

BRIEF DESCRIPTION OF THE DRAWINGS

Embodiments of the present disclosure will now be described with reference to the annexed drawings, which are provided purely by way of non-limiting example and in which:

FIG. 10 shows an embodiment of method for allocating volatile memory in a multi-subscription SIM module; and FIGS. 9 and 11-13 shows a volatile memory of a multi-subscription SIM module in different step of the method of FIG. 10.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to FIGS. 1 to 5 are denoted by the same references previously used in such figures. The description of such previously described elements will not be repeated in the following in order not to overburden the present detailed description.

Figure 7:
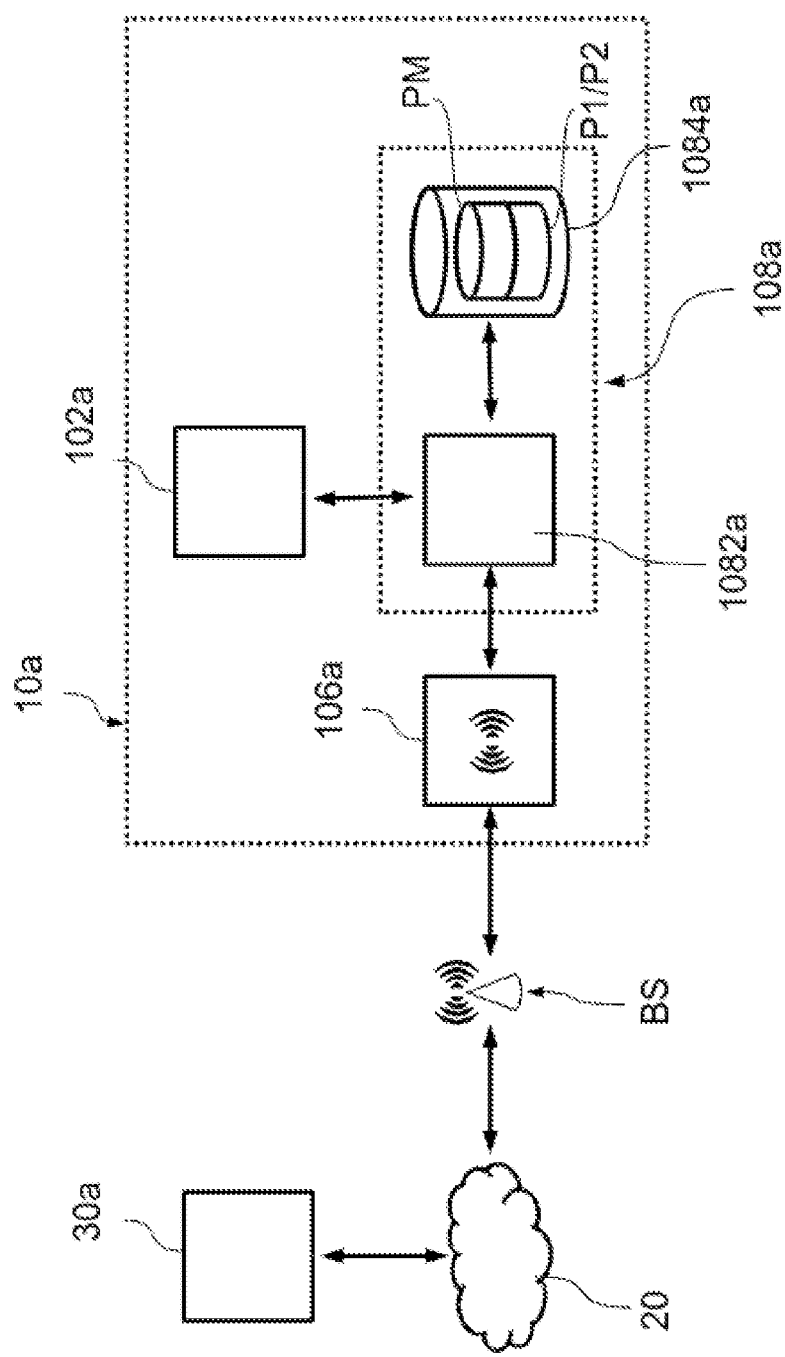
FIG. 7 shows an embodiment of the software architecture of a multi-subscription SIM module containing a plurality of profiles.

Now, with reference to FIGS. 7 and 8 it is illustrated a possible procedure for enabling of a profile in a eUICC card 108a which can make use of the solution for allocating the memory space of the volatile memory described in the following. FIG. 7 shows an embodiment, in which the profile manager PM may communicate with a remote host 30a in order to install, update and/or enable a profile P1/P2 by means of remote management commands.

Again, the SIM module 108a comprises one and more processors 1082a and one or more memories 1084a for executing applications stored in the memory 1084a of the module 108a. In this case, the profile manager application PM may be configured to communicate (directly, or indirectly via the processor 102a and possibly the operating system OSa) with the communication interface 106a in order to send data to and/or receive data from the remote host 30a.

For example, the host 30a may be connected via a network 20, such as a Local Area Network (LAN) or a Wide Area Network (WAN), such as the internet, to the base station BS. Accordingly, connection between the host 30a and the SIM module 108a may be established by means of the network 20, the base station BS and the communication interface 106a.

Figure 8:
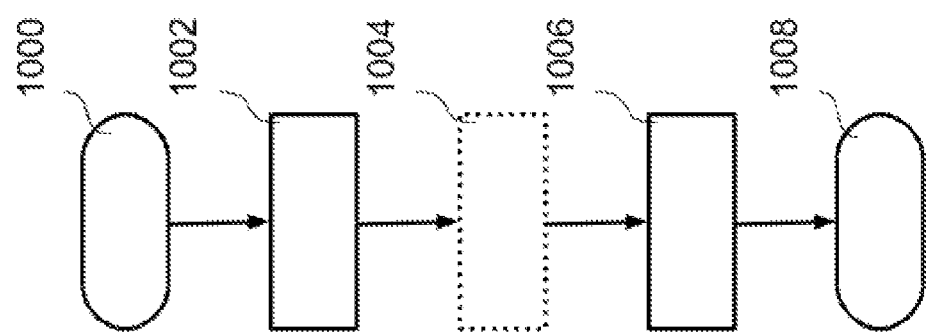
FIG. 8 shows an embodiment of a method for enabling a profile by means of a mobile device.

For example, FIG. 8 shows a flow chart of a possible method which permits to enable a profile in the SIM module 108a. Specifically, in the embodiment considered, the SIM module 108a has installed at least a first profile P1.

After a start step 1000, the device boa connects in a step 1002 to a base station BS by using the profile data Pb, e.g., by using the authentication data AUTH of the profile Pb. In general the device boa uses the profile data which are selected as active enabled profile at boot, i.e., at power-on of the device 10. At the power on the handset, i.e., the device 10, always uses the "enabled profile"; changing of enabled profile in the described embodiment requires a reset, in particular a power cycle. Alternatively a hot swap like in USB plug and play can be applied.

Next, in a step 1004, the host 30a sends one or more remote management commands to the profile manager PM in order to install or update a new profile P2, which is downloaded from the remote host 30a.

Once the new profile P2 has been installed or updated, the host 30a sends in a step 1006 a remote management command to the profile manager PM in order to enable the profile P2.

Finally, the method ends at a stop step 1008.

The profile manager PM may be alternatively substituted by any software or firmware implementing a remote protocol, such as OTA, to allow the download/enable/delete of profiles to the card after card issuance.

For example, this embodiment may be suitable for automated systems, such as gas meters or any other type of remote monitoring and/or control systems. In this case, the application CFG may also not be required. However, the method could also be used for mobile devices, such as smart-phones or tablets.

Figure 1:
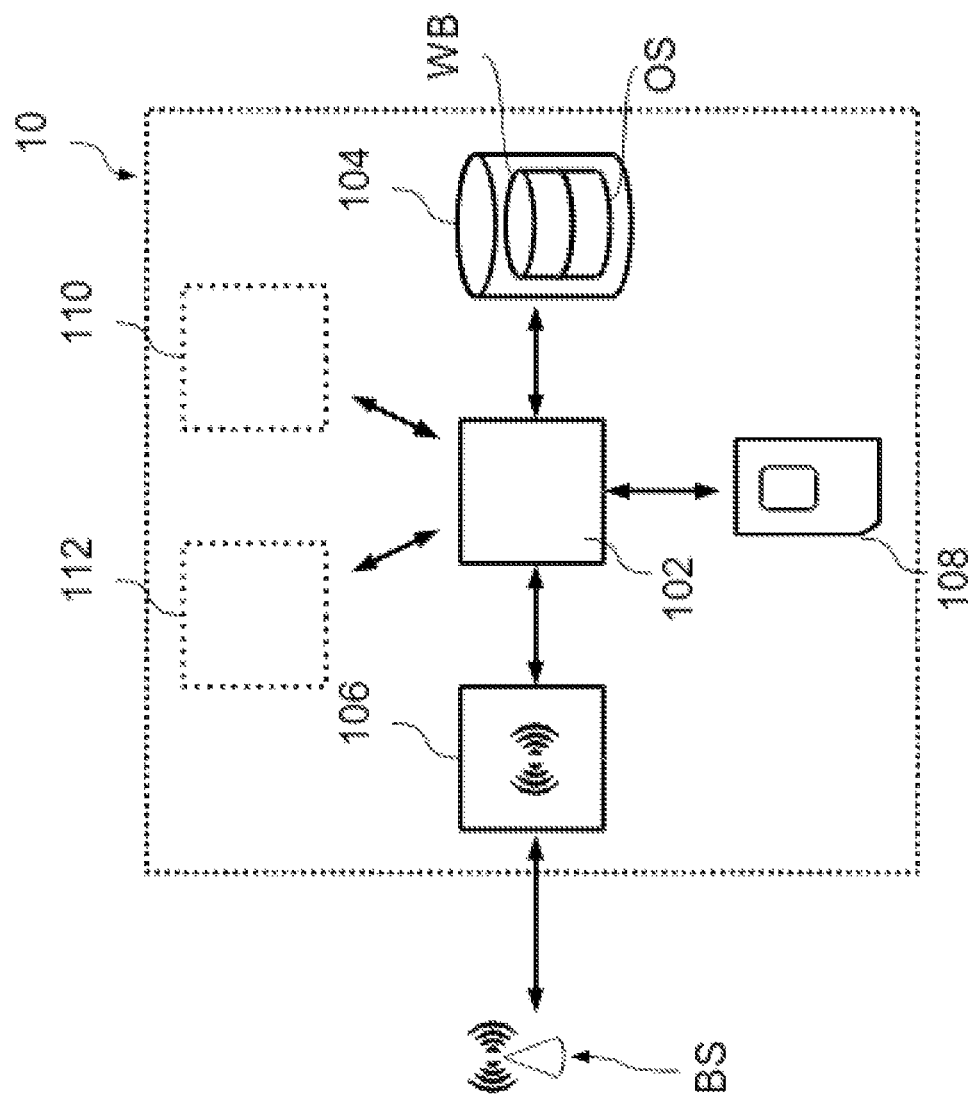
FIGS. 1 to 6 have already been described in the foregoing.
Figure 2:
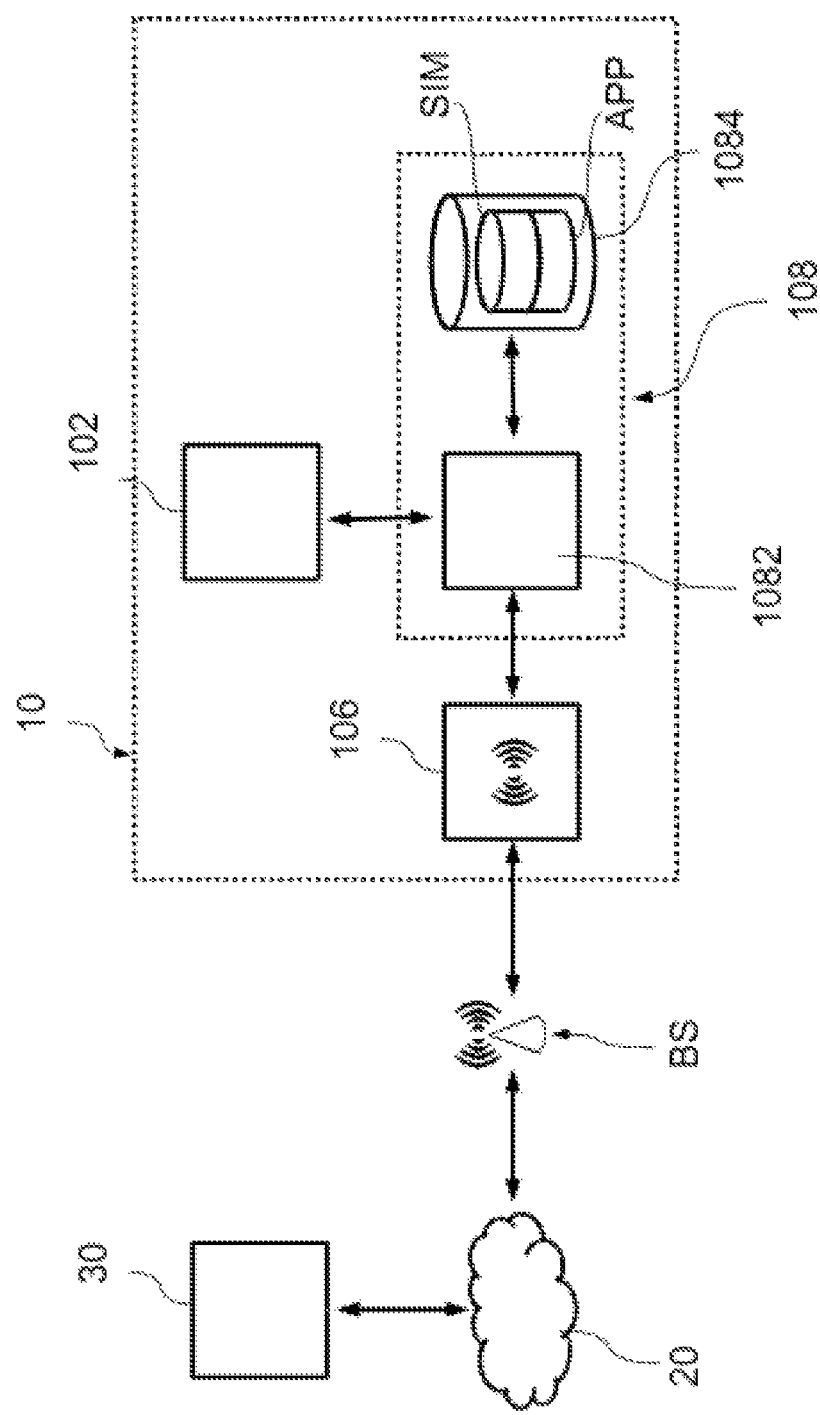
Figure 3:
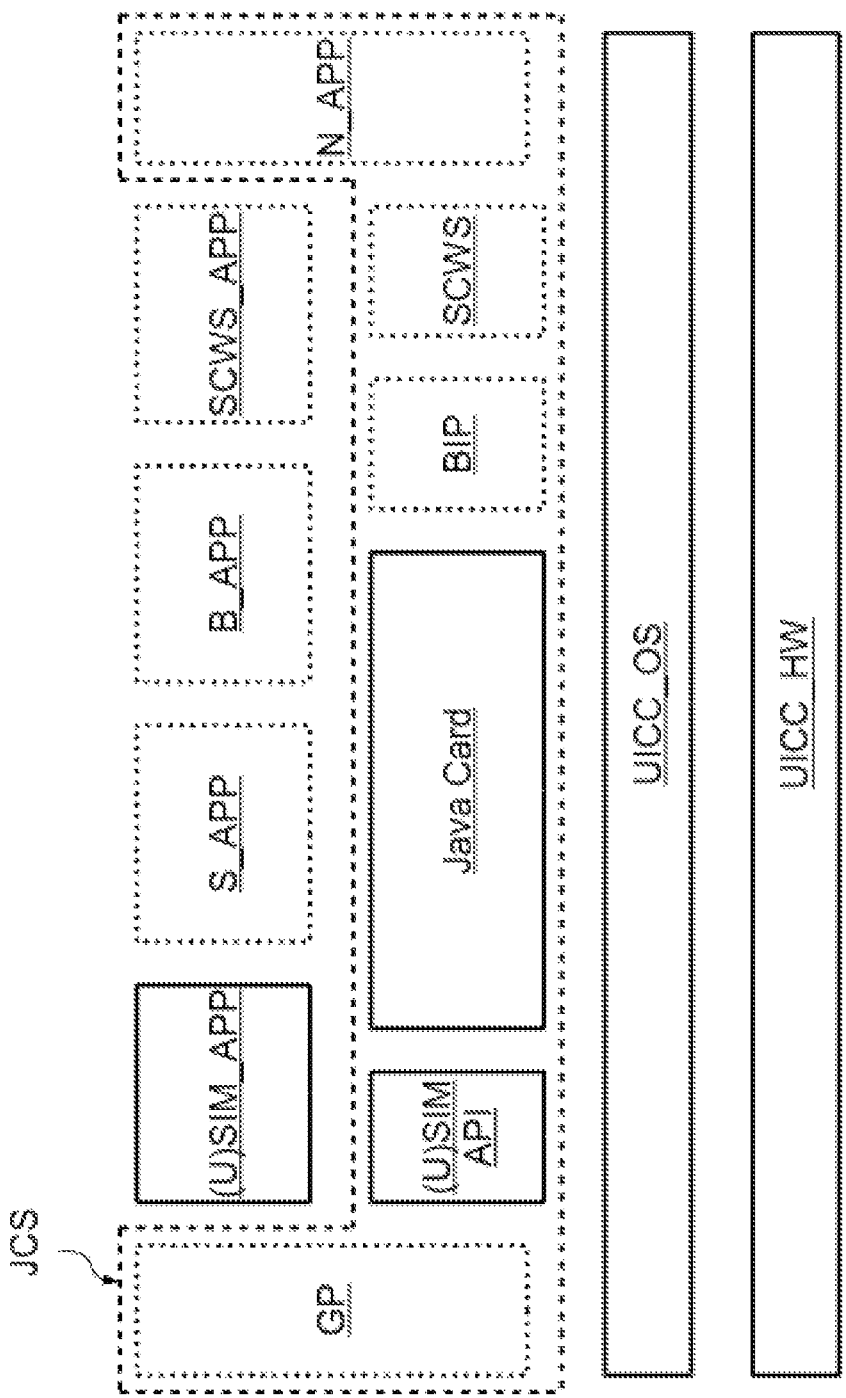
Figure 4:
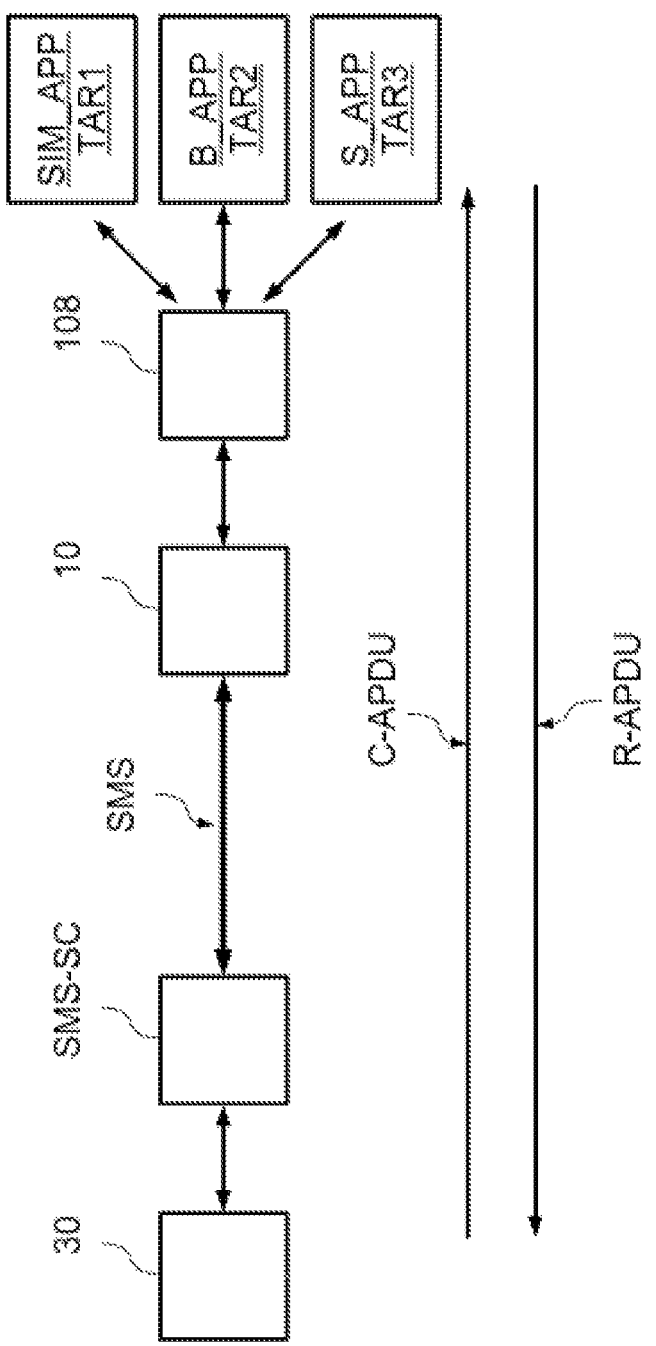
Figure 5:
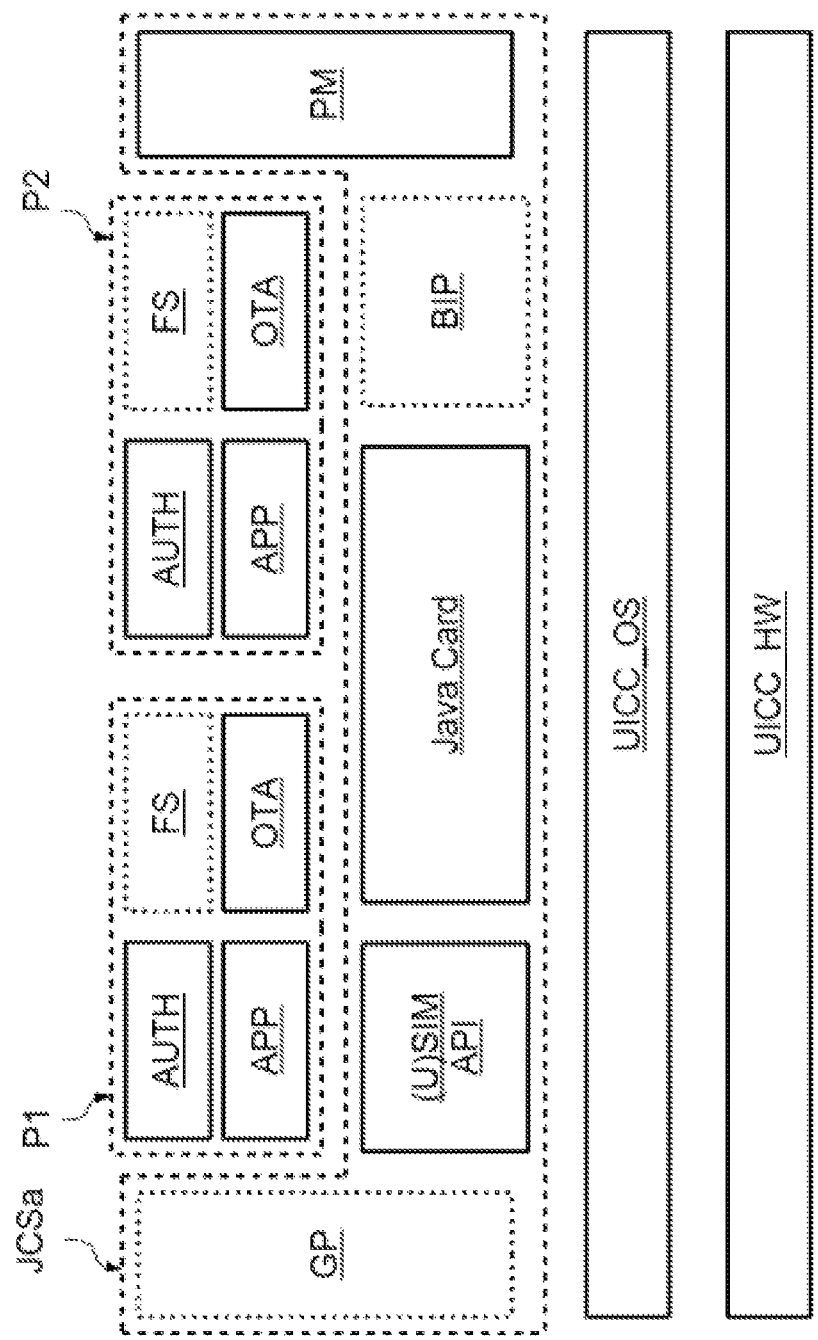
Figure 6:
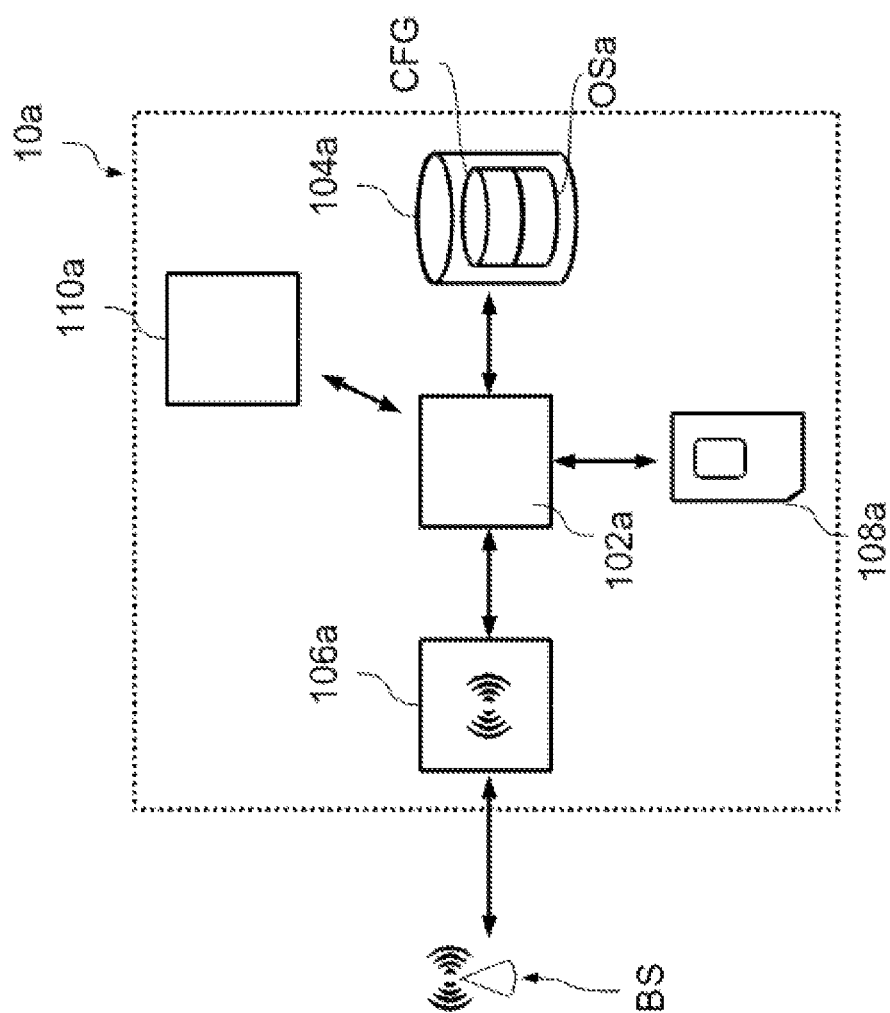

Generally, the embodiments described with respect to FIG. 6 and FIGS. 7 and 8 could also be combined, e.g., the SIM module 108a could be configured such that a profile may be installed, updated and/or enabled by means of an application installed in the device 10a and/or by means of a remote management command received from a remote host 30a.

Accordingly, independently of the method used to install, update and/or enable profiles, a multi-subscription SIM module 108a may comprises a plurality of profiles, wherein each profile may comprise respective applications and possible other content. Moreover, as mentioned in the foregoing, each application is usually identified by means of a TAR code in order to permit a remote management of the respective application.

The proposed solution basically provides that on the SIM module 108a there are several profiles, but only one of them is available at a certain time.

In order to change from one profile to another, in the example here described from profile P1 to P2, a "power cycle" is required (i.e., the card is powered off/on), and the power cycle resets the RAM values in the RAM portion of the memory 1084a. Through the power cycle therefore the RAM memory of sessions preceding the power cycle can be de-allocated when a profile change happens.

After the power cycle is necessary however to allocate a part of the RAM memory for the active profile (in the example, the new active profile will be P2), for instance to store in the RAM memory the volatile variables of the application to be executed, but taking in account that also a profile under download needs RAM memory. If the profile selected as enabled profile takes all the memory resources, there could be not enough memory to perform the memory download.

The proposed solution operates allowing the SIM module 108a to allocate to the enabled active profile, i.e., Ps, only part of its volatile memory. More specifically, the SIM module 108a is configured to accommodate volatile memory for two profiles: the enabled profile Ps, and the profile under download Pd.

According to the current standard, there is only one enabled profile Ps and at most one profile under download Pd at any time.

As better shown with reference to FIG. 9 were a RAM memory 1084R of the memory 1084a is schematically shown, RAM Memory 1084R is partitioned in three parts: an Operative System Memory partition OSP, an enabled profile partition SPP, and a downloading profile partition DPP.

The enabled profile partition SPP and the downloading profile partition DPP have the same size. This guarantees that the profile partitions are exchangeable.

In FIG. 10 is shown a flow diagram representing an embodiment of the here proposed method for managing the RAM memory 1084 in the UICC card 108a using multiple profiles containing respectively one or more applications.

The method, after a start step 2000, includes an operation 2005 of dividing the area of the RAM memory 1084R in a partition for the operative system OSP, a partition for the enabled profile SPP and a partition for a downloaded profile DPP, where the partition for the enabled profile SPP and a partition for a downloaded profile DPP have the same size. This operation has been already detailed with reference to FIG. 9.

Then, at boot, i.e., when the SIM module 108a is powered on, i.e., put in on state of a power cycle, it is performed an operation 2010 of allocating the partition for the enabled profile SPP to an enabled profile Ps, maintaining the partition for a downloaded profile DPP not accessible.

Figure 11:
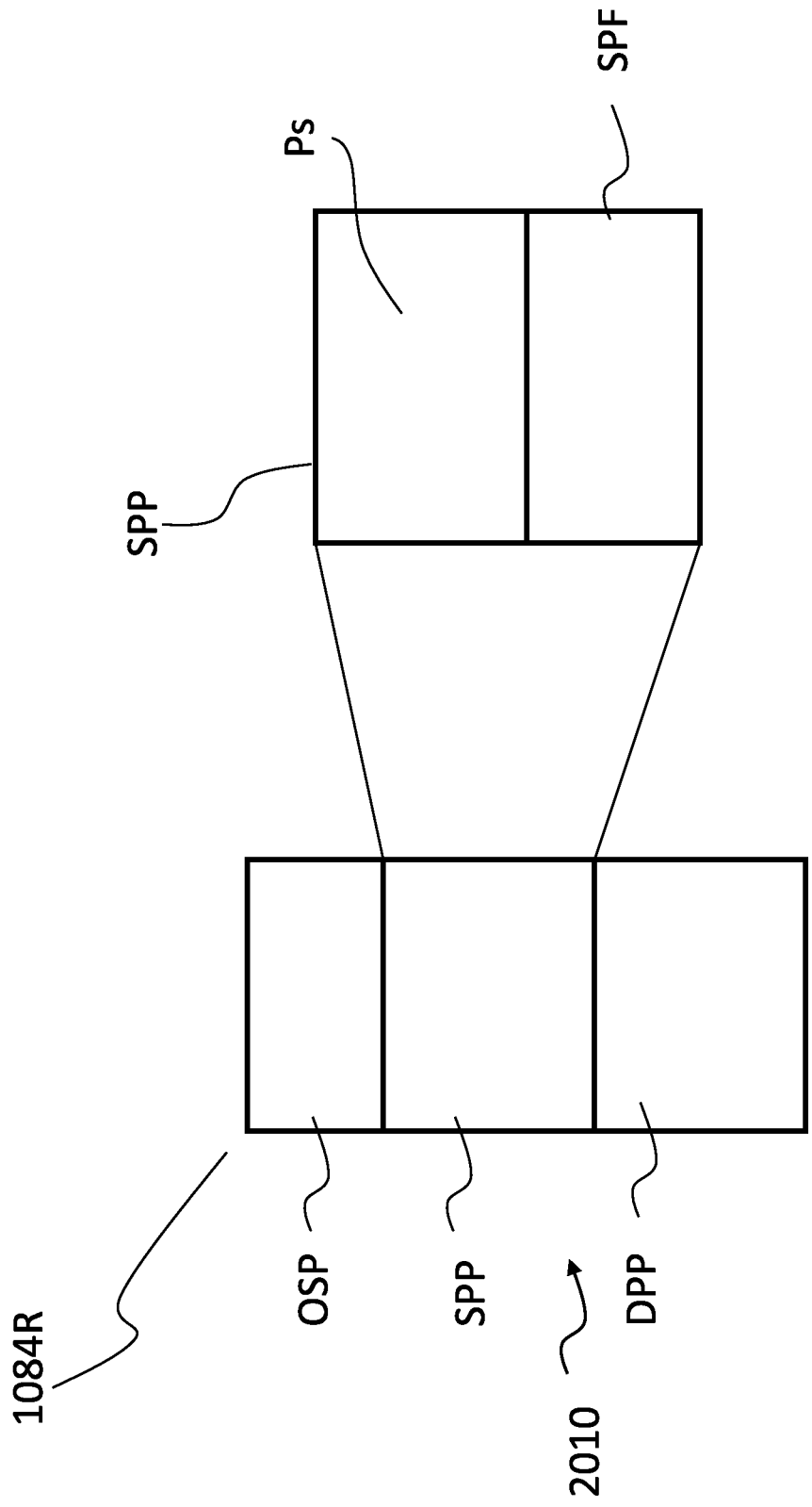

Details of such operation 2010 are shown in FIG. 11, which show how, at boot, when the SIM module is powered on, space in the memory 1084R is allocated by allocating a enabled profile Ps, for instance the profile P1, in the enabled profile partition SPP, while the rest of the space of memory 1084a is maintained empty. The enabled profile Ps occupies a space in the enabled profile partition SPP and if it is smaller in size than the enabled profile partition SPP leaves a free space SPF, which can be at best of zero dimension if the enabled profile has the same size of the enabled profile partition SPP. On the other hand, the downloading profile partition DPP is not accessible, i.e., if the enabled profile Ps try to allocate memory, the allocation would fail in case the amount of memory of the enabled profile partition SPP is not enough.

Then, during a profile download operation, it is performed an operation 2015 of accessing only the partition for a downloaded profile DPP allocating memory space in the partition to the downloaded profile Pd.

Figure 12:
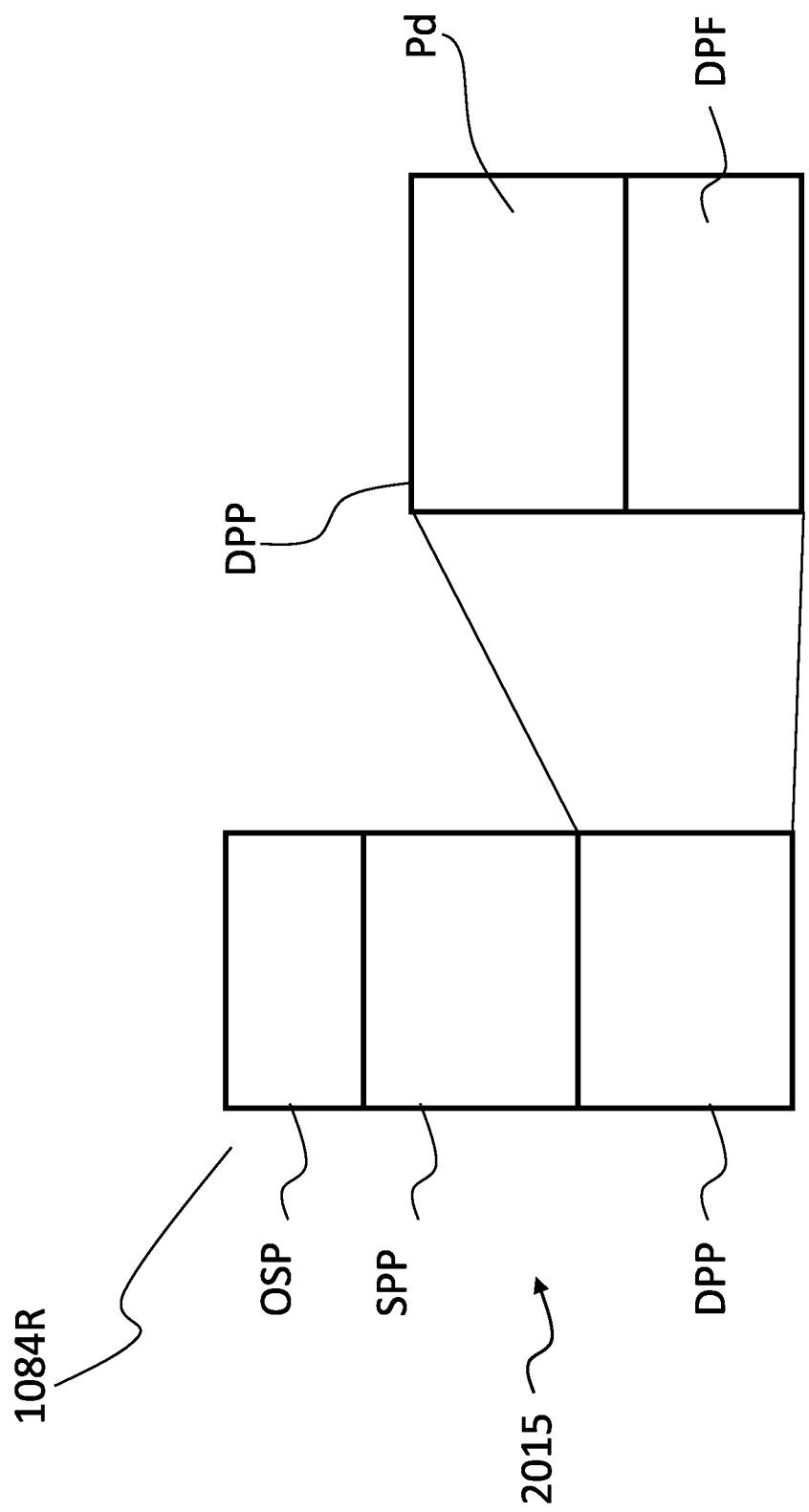

Details of such operation 2015 are shown in FIG. 12, which show how, during profile download, for instance during step 1004, the profile under download Pd occupies a space in the downloaded profile partition DPP and if it is smaller in size than the downloaded profile partition DPP leaves a free space DPF, which can be at best of zero dimension if the enabled profile has the same size of the downloaded profile partition DPP. During download, the profile under download Pd can access only the downloading profile partition DPP and not the enabled profile partition SPP. This guarantees the memory availability to both the enabled profile Ps and the downloading profile Pd.

Figure 13:
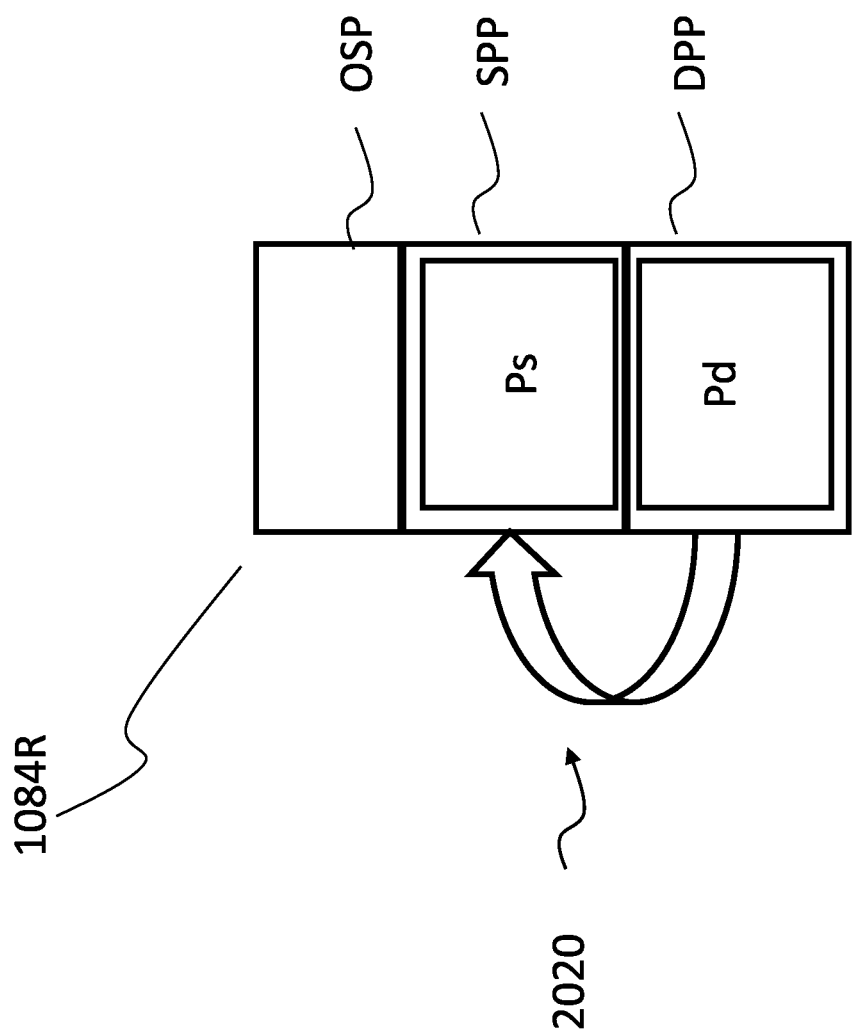

Then, as shown in FIG. 13, during a profile change operation, for instance during step 1006 of profile enabling, it is provided an operation 2020 of swapping the downloading profile Pd from the partition for a downloaded profile DPP to the partition for the enabled profile SPP.

The profile change operation, for instance step 1006 of profile enabling, is performed after a reset of the eUICC card, in particular after a power cycle. A reset of the eUICC card or of a SIM module in general is not necessarily a power cycle. A power cycle requires that the supply voltage goes to zero (off state) and then back to nominal value (on state). This is equivalent to a so-called 'cold reset'. However cards usually have also a reset physical contact, i.e., an electric contact which can be actuated to perform a so-called 'warm reset'. Such warm reset is for instance the one performed to reboot the phone. The warm reset is equivalent to the cold reset but it is not a power cycle.

The sizes of the two partitions SPP and DPP are the same, i.e., the enabled profile partition SPP has the same size of the downloading profile partition DPP. This implies that, if the downloaded profile Pd is selected to be the next active profile, it is ensured that its memory size will fit, at subsequent power cycle the enabled profile partition SPP, i.e., it will be equal or smaller than the size of the partition SPP. The swap 2020 (after reset) is shown in FIG. 7. As mentioned, the profile change operation is performed after a power cycle of the SIM module 180a.

Finally, the method ends at a stop step 2025.

In possible variant embodiments it is possible to have more than one enabled profiles, for instance in a device with multiple radio access such as dual SIM mobile phones. In this case, if a number n of profiles Ps1 . . . Psn is enabled, then the RAM Memory 1084R is partitioned as follows: one Operative System Memory partition OSP, n enabled profile partitions SPP, and one downloading profile partition DPP. Each of the n profile partitions SPP has the size of the downloading profile partition DPP and the downloaded profile Pd is swapped to one of such n enabled profile partitions SPP, which can be selected by the Program Manager or any other module managing the enablement of the active profiles.

Therefore in general the solution here described provides a method for performing a management of a multi-subscription SIM module 108a, such multi-subscription SIM module 108a comprising at least one memory 1084a adapted to store at least a first P1 and a second P2 profile, or a plurality of profiles, associated with a respective first and a second mobile network operator, or operator line or contract, such memory 1084 comprising a volatile portion 1084R, the operation of storing including the operation 1004 of installing or updating the profiles P1, P2 by downloading one more downloaded profile Pd from a remote host 30a, the management including selecting one or more enabled profiles Ps comprising an application to be executed and allocating a partition of the volatile portion 1084R of the memory to one or more enabled profile Ps.

The method further includes the operations of: dividing 2005 the area of the volatile memory 1084R in a partition OSP for the operative system, a partition SPP for the each of the one or more enabled profiles Ps and a partition for a downloaded profile DPP, the partitions for the enabled profile SPP and partition for a downloaded profile DPP having the same size, allocating 2010 the partition for the enabled profile SPP to the enabled profile Ps, maintaining the partition for a downloaded profile DPP not accessible, during a profile download operation 1004, accessing 2015 only the partition for a downloaded profile allocating the partition for a downloaded profile DPP to the downloaded profile Pd, during a profile change operation 1006 swapping 2020 the downloading profile Pd from the partition for a downloaded profile DPP to one of the partitions for the enabled profile SPP.

The described solution is more efficient with respect to the methods allocating RAM memory for all the profiles, since only two profiles at a time need to be accommodated.

The described solution is more reliable with respect to methods allocating RAM memory at request, where in case there is not enough memory for a profile in execution or under download, an error is reported only at runtime. In proposed solution, the profile loading fails and the operator can take corrective measures.

The described technical solution thus provides an efficient usage of RAM memory in eUICC while guaranteeing runtime memory allocation to all systems with high reliability. Other known solutions need to compromise on efficiency or on runtime availability.

Therefore the described solution provides a new volatile, i.e., RAM, memory manager that optimizes RAM resources in eUICC (UICC supporting multiple subscriptions) while preserving runtime availability of resources.

Of course, without prejudice to the principle of the invention, the details of construction and the embodiments may vary widely with respect to what has been described and illustrated herein purely by way of example, without thereby departing from the scope of the present invention, as defined by the ensuing claims.

The profiles are indicated as associated with a respective mobile network operator. The definition of different mobile network operator however includes also the case in which the different profiles represent different lines or subscriptions of a same operator, e.g., Telecom Italia, such as a business line and personal line.

What is claimed is:

1. A method for enabling a profile in a multi-subscription SIM module comprising a memory that comprises a first memory partition for an operating system, a second memory partition for an enabled profile, and a third memory partition for a downloaded profile, the third memory partition and the second memory partition having equivalent sizes, the method comprising:
   connecting, to a base station, using the enabled profile allocated to the second memory partition, the enabled profile being associated with a first mobile network operator;
   downloading, from a remote host, a downloaded profile, the downloaded profile being associated with a second mobile network operator;
   accessing, when downloading the downloaded profile, the third memory partition, while maintaining the second memory partition as being non-accessible;
   allocating the third memory partition to the downloaded profile; and
   enabling the downloaded profile.

2. The method of claim 1, wherein enabling the downloaded profile comprises swapping the downloaded profile from the third memory partition to the second memory partition.

3. The method of claim 1, wherein enabling the downloaded profile comprises receiving a remote management command, from the remote host, to enable the downloaded profile.

4. The method of claim 1, wherein enabling the downloaded profile comprises enabling the downloaded profile after a power cycle.

5. The method of claim 1, wherein enabling the downloaded profile comprises enabling the downloaded profile after the multi-subscription SIM module is reset.

6. The method of claim 1, further comprising:
   selecting the enabled profile; and
   allocating the second memory partition to the enabled profile, while maintaining the third memory partition as being non-accessible.

7. The method of claim 6, wherein allocating the second memory partition to the enabled profile is performed when the multi-subscription SIM module is powered on.

8. The method of claim 1, wherein the memory comprises a volatile memory.

9. A method for enabling a profile in a multi-subscription SIM module comprising a memory that stores a first profile and a second profile respectively associated with a first mobile network operator and a second mobile network operator, the method comprising:
   dividing the memory in a partition for an operating system, partitions for enabled profiles, and a partition for a downloaded profile, the partition for enabled profiles and the partition for a downloaded profile having equivalent sizes;
   selecting an enabled profile comprising an application to be executed;
   allocating a first one of the partitions for the enabled profile to the enabled profile, while maintaining the partition for a downloaded profile non-accessible;
   connecting, to a base station, using the enabled profile allocated to the first one of the partitions for the enabled profile;
   downloading, from a remote host, a downloaded profile;
   accessing, when downloading the downloaded profile, the partition for a downloaded profile, while maintaining the partition for enabled profiles non-accessible;
   allocating the partition for a downloaded profile to the downloaded profile; and
   enabling the downloaded profile by swapping the downloaded profile from the partition for a downloaded profile to a second one of the partitions for enabled profiles.

10. The method of claim 9, further comprising resetting the multi-subscription SIM module.

11. The method of claim 10, wherein resetting the multi-subscription SIM module comprises resetting the multi-subscription SIM module as a result of a power cycle.

12. The method of claim 9, wherein the multi-subscription SIM module is an eUICC card.

13. The method of claim 9, wherein the second one of the partitions for enabled profiles and the first one of the partitions for enabled profiles are identical.

14. The method of claim 9, wherein the second one of the partitions for enabled profiles is different from the first one of the partitions for enabled profiles.

15. The method of claim 9, wherein selecting the enabled profile comprises selecting only one enabled profile.

16. The method of claim 9, wherein selecting the enabled profile comprises selecting a plurality of enabled profiles.

17. A multi-subscription SIM module, comprising:

a processor; and a memory comprising a first memory partition for an operating system, a second memory partition for an enabled profile, and a third memory partition for a downloaded profile, the third memory partition and the second memory partition having equivalent sizes, the processor being configured to implement a method comprising:

connecting, to a base station, using the enabled profile allocated to the second memory partition, the enabled profile being associated with a first mobile network operator;

downloading, from a remote host, a downloaded profile, the downloaded profile being associated with a second mobile network operator;

accessing, when downloading the downloaded profile, the third memory partition, while maintaining the second memory partition as being non-accessible;

allocating the third memory partition to the downloaded profile; and enabling the downloaded profile by swapping the downloaded profile from the third memory partition to the second memory partition.

18. The multi-subscription SIM module of claim 17, wherein enabling the downloaded profile comprises receiving a remote management command, from the remote host, to enable the downloaded profile.

19. The multi-subscription SIM module of claim 17, wherein enabling the downloaded profile comprises enabling the downloaded profile after a power cycle.

20. The multi-subscription SIM module of claim 17, wherein enabling the downloaded profile comprises enabling the downloaded profile after the multi-subscription SIM module is reset.

* * * * *